No. 682,474. Patented Sept. 10, 1901.
D. LUTZ.
HAY RAKE.
(Application filed July 8, 1901.)
(No Model.)
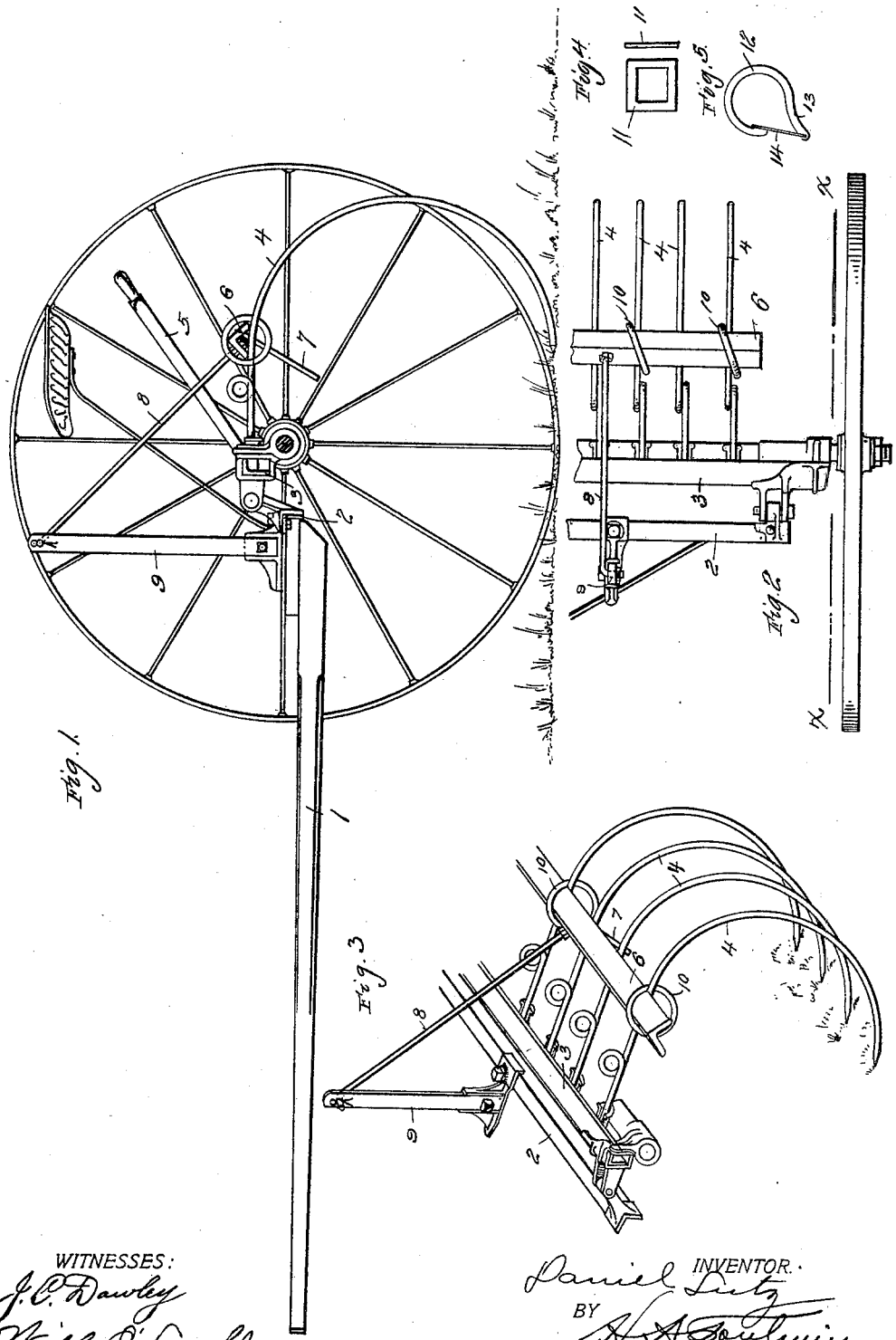
WITNESSES:
J. C. Dawley
Will O'Laughlin
INVENTOR.
Daniel Lutz
BY
H. A. Goulmin
ATTORNEY.
THE NORRIS PETERS CO., PHOTO-LITHO., WASHINGTON, D. C.

UNITED STATES PATENT OFFICE.

DANIEL LUTZ, OF SPRINGFIELD, OHIO, ASSIGNOR TO THE THOMAS MANUFACTURING COMPANY, OF SAME PLACE.

HAY-RAKE.

SPECIFICATION forming part of Letters Patent No. 682,474, dated September 10, 1901.

Application filed July 8, 1901. Serial No. 67,392. (No model.)

*To all whom it may concern:*

Be it known that I, DANIEL LUTZ, a citizen of the United States, residing at Springfield, in the county of Clark and State of Ohio, have invented certain new and useful Improvements in Hay-Rakes, of which the following is a specification, reference being had therein to the accompanying drawings.

This invention relates to hay-rakes, and more particularly to that class known as "horse" hay-rakes, and has for its object to provide a simple and effective means for holding the cleaner-bar in operative relation to the rake-teeth. In rakes of this description it is customary to employ a cleaner-bar, usually provided with a plurality of fingers, to clear the hay from the rake-teeth when these latter are raised to dump the hay. It has been found that in practice the accumulation of hay will at times raise the bar above the teeth into a position where it is inoperative for the purpose of properly effecting its cleaning function.

The object of my invention is to provide a simple, inexpensive, and efficient device for holding the cleaner-bar in operative position relative to the rake-teeth; and to this end the invention consists in certain novel features, which I will now proceed to describe and will then particularly point out in the claims.

In the accompanying drawings, Figure 1 is a vertical sectional view, taken on the line *x x* of Fig. 2, of a rake having my improvements applied thereto. Fig. 2 is a partial plan view of the same. Fig. 3 is a detail perspective view, and Figs. 4 and 5 illustrate modifications of the retaining device.

It will be understood that my invention is applicable to horse hay-rakes of any approved construction, and in the present instance I have shown the same as employed in conjunction with a rake of a well-known type, in which 1 indicates the tongue, 2 the frame, and 3 the rake-head, pivotally connected with the frame and carrying the rake-teeth 4. 5 indicates the lever by means of which the rake head and teeth may be oscillated or tilted to raise the teeth and discharge the bundle of hay. These parts may, as already stated, be of any suitable construction.

The cleaner-bar is indicated at 6 and extends across the upper portion of the rake-teeth 4, being provided at suitable intervals with cleaning-pins 7, extending downward therefrom, as shown. This bar is supported in position by means of rods 8, preferably two in number and located one near each end of the bar, their forward ends being pivotally connected to the upper ends of standards 9, secured on the frame 2. In order to prevent the cleaner-bar from being lifted from its operative position by the accumulation of hay, I employ a plurality of retaining devices 10. Any suitable number of these retaining devices may be used. Each retaining device is independent of or disconnected from the cleaner-bar and rake-teeth, but passes around both the bar and one of the teeth at the point where the tooth and bar are in contact with each other. I prefer to make these retaining devices in the form of rings, as illustrated in Figs. 1, 2, and 3, although other forms may be employed. It will be understood that the retaining devices not only pass around the cleaner-bar, but also around the adjacent tooth, so that the tooth prevents displacement of the retaining device on the cleaner-bar, while the cleaner-bar prevents the retaining device from slipping freely along the tooth, and thus falling off. It will also be noted that at the same time the retaining devices do not in any way prevent the free movement of the tooth relatively to the cleaner-bar in the operation of dumping and replacing the rake, and it will further be seen that during these operations and also during the period when the rake is at work gathering the hay the retaining devices will hold the cleaner-bar down in position on the teeth and prevent said bar from being lifted by the accumulation of hay into an inoperative position.

As I have already stated, the retaining devices may be of other form than the ring form shown in Figs. 1, 2, and 3. For instance, I have shown in Fig. 4 a retaining device 11, which is in the form of a square loop, while in Fig. 5 I have shown a retaining device 12, which is approximately of a ring form, but is severed and has one arm extended, as indicated at 13, and the opening thus formed closed by a spring-strip 14. This latter form may obviously be more readily applied than the closed forms shown in Figs. 1 to 4.

I do not wish to be understood as limiting myself to the precise details of construction hereinbefore described and shown in the accompanying drawings, as these details may obviously be modified without departing from the principle of my invention.

Having thus fully described my invention, what I claim as new, and desire to secure by Letters Patent, is—

1. In a rake, the combination, with a frame, a rake-head pivoted thereto and having curved teeth, and means for operating said head and teeth, of a cleaner-bar pivotally supported from the frame, and a plurality of independent retaining devices, each retaining device passing around the cleaner-bar and also around one of the teeth, substantially as described.

2. In a rake, the combination, with a frame, a rake-head pivoted thereto and having curved teeth, and means for operating said head and teeth, of a cleaner-bar pivotally supported from the frame, and a plurality of independent retaining devices located at intervals on the cleaner-bar, said retaining devices being annular in form and passing loosely around the cleaner-bar and also around one of the rake-teeth, substantially as described.

In testimony whereof I affix my signature in presence of two witnesses.

DANIEL LUTZ.

Witnesses:
E. O. HAGAN,
WILL O'LAUGHLIN.